United States Patent [19]

Field et al.

[11] 3,891,711

[45] June 24, 1975

[54] PRODUCTION OF KETONES

[75] Inventors: Peter G. S. Field, Bebington; David A. Lock, Heswall, both of England

[73] Assignee: Burmah Oil Trading Limited, Swindon, England

[22] Filed: Jan. 21, 1974

[21] Appl. No.: 435,035

[30] Foreign Application Priority Data
Jan. 24, 1973 United Kingdom................. 3694/73

[52] U.S. Cl........... 260/597 R; 252/431; 260/597 B
[51] Int. Cl............................................. C07c 45/02
[58] Field of Search ..................... 260/597 R, 597 B

[56] References Cited
UNITED STATES PATENTS
3,346,623 10/1967 Young............................ 260/597 R
FOREIGN PATENTS OR APPLICATIONS
1,041,946 9/1966 United Kingdom
OTHER PUBLICATIONS
Schrauzer et al., et al., J.A.C.S., 87, pp. 1483–1489.

*Primary Examiner*—Bernard Helfin
*Assistant Examiner*—James H. Reamer
*Attorney, Agent, or Firm*—Browdy and Neimark

[57] ABSTRACT

Ketones are prepared by oxidising an olefinically unsaturated compound containing at least three carbon atoms with an organic hydroperoxide in the presence as catalyst of a metal complex containing the grouping:

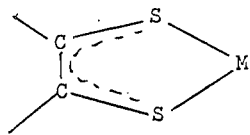

wherein M is an atom of platinum or palladium.

16 Claims, No Drawings

PRODUCTION OF KETONES

This invention relates to the production of ketones by the oxidation of olefinically unsaturated compounds.

Olefinically unsaturated compounds have been oxidised to carbonyl compounds commercially by a process involving the use of palladium salts as catalysts. The process is generally carried out in a strongly acidic aqueous medium and in a typical process, the oxidation is carried out using molecular oxygen as oxidant in the presence of an aqueous reaction medium containing palladium chloride and cupric chloride.

The reaction medium used in this process is acidic and highly corrosive and consequently the equipment in which the process is carried out has to be constructed of expensive corrosion-resistant materials such as, for example, titanium. Also, olefinically unsaturated compounds having terminal unsaturation are frequently isomerised under the reaction conditions used to give compounds having internal unsaturation which cannot be converted to the desired products and although the process is effective in converting ethylene and other lower alkenes to carbonyl compounds, the oxidation does not proceed satisfactorily with higher molecular weight olefinically unsaturated compounds.

We have now discovered a process for producing ketones from olefinically unsaturated compounds which involves the use of a novel catalyst which is not acidic in nature and which enables not only low molecular weight olefinically unsaturated compounds to be oxidised to ketones but also enables the production of ketones from olefinically unsaturated compounds of relatively high molecular weight. Since the reaction medium does not have to be strongly acidic in nature, the vessels used for carrying out the oxidation need not be constructed of such corrosion resistant materials as are required in processes involving the use of aqueous solutions of palladium salts and in fact, it has been found that the oxidation can be carried out with the reactants in solution in inert organic solvents such as, for example hydrocarbons.

According to the present invention, there is provided a process for producing a ketone which comprises oxidising an olefinically unsaturated compound containing at least three carbon atoms with an organic hydroperoxide in the presence as catalyst of a metal complex containing the grouping:

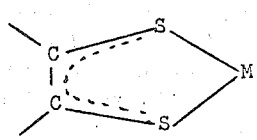

wherein M is an atom of palladium or platinum.
Preferably the metal complex has the formula:

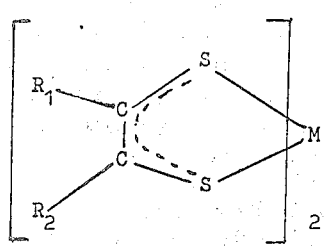

wherein $R_1$ and $R_2$, which may be the same or different represent substituted or unsubstituted hydrocarbyl groups or together with the carbon atom to which they are attached form an alicyclic ring, for example a cyclohexane ring as in bis-(1,2-cyclohexanedithionate).

Metal complexes are known having the structure set forth above. The preparation and characterisation of such complexes has been described in various publications, for example The Journal of the American Chemical Society, 84, pages 3221 and 3596–97 (1962); ibid, 87, pages 1483–89 (1965); Inorganic Chemistry, 2, pages 1227–1232 (1963); Discussions of the Faraday Society, 46, (1968) and Israel Journal of Chemistry 8, pages 125–139 (1970).

Preferred amongst the hydrocarbyl groups satisfying $R^1$ and $R^2$ are aryl groups (including alkaryl groups, the alkyl substituents of which preferably contain from 1 to 6 carbon atoms) and particularly phenyl groups. The term "hydrocarbyl" is also to be understood to include aliphatic groups, e.g., alkyl and cycloalkyl groups. Thus, for example, $R^1$ and $R^2$ may be alkyl groups, for example alkyl groups containing from one to eight and preferably one to four carbon atoms.

If desired, the hydrocarbyl groups may be substituted, e.g., by halogen atoms as in, for example, chloro- and/or fluoro-substituted phenyl groups and chloro- and/or fluoro-substituted methyl groups, or, e.g., alkoxy groups, which preferably contain from one to six carbon atoms. A particularly preferred substituted alkyl group is trifluoromethyl.

Further examples of substituted hydrocarbyl groups are groups providing the carbon and sulphur atoms of a grouping:

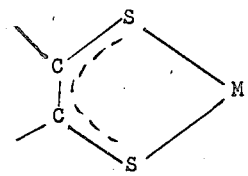

in which M is as defined above. In such cases it will be appreciated that a single molecule of the metal complex may contain more than one metal atom, which may be the same or different.

The catalyst may conveniently be prepared according to the procedure described on page 1487 of Volume 84 (1962) of the Journal of the American Chemical Society, which in broad terms comprises substituting sulphur atoms for the oxygen atoms of the hydroxyl and keto groups of an α-hydroxy ketone, reacting the sulphur-containing product so produced with a salt containing platinum or palladium as a cation or as a complex anion, recovering a solid containing a metal complex containing the grouping:

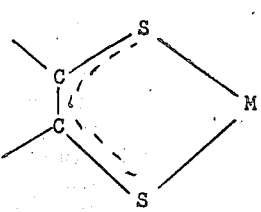

and extracting the complex with an organic solvent.

The process of the invention is especially applicable to the production of ketones by oxidising olefinically unsaturated compounds containing from three to 24 carbon atoms and it has been found that in contrast to processes involving the use of an aqueous solution of a palladium salt as catalyst, the process of the invention may be used to obtain ketones from olefinically unsaturated compounds of relatively high molecular weight, for examples those containing six or more carbon atoms and in particular those containing from six to 16 carbon atoms. Preferably the olefinically unsaturated compound is a hydrocarbon, however olefinically unsaturated substituted hydrocarbons may also be converted to ketones by the process of the invention.

Although a wide variety of olefinically unsaturated compounds may be oxidised to ketones using the process of the invention, it has been found that those containing the grouping —CH=CH$_2$ ($\alpha$-olefins) are particularly suitable, these compounds yielding methyl ketones on oxidation. Examples of such compounds are alk-1-enes.

The unsaturated compound may contain more than one double bond, in which case a di-ketone may be formed on oxidation, however compounds containing a single double bond are generally preferred, and in particular linear olefinically unsaturated compounds containing a single double bond.

The hydroperoxide used in the process of the invention may be represented by the formula:

$$R^1\text{—OOH}$$

wherein $R^1$ is substituted or unsubstituted hydrocarbon group, for example an alkyl, cycloalkyl, aryl, alkaryl or aralkyl group, which may be unsubstituted or substituted by for example one or more substituents selected from halogen atoms and alkyl, alkoxy and nitro groups. The groups represented by $R^1$ may also have as substituents one or more further hydroperoxide groups. Examples of hydroperoxides which may be used are aralkyl, particularly secondary and tertiary aralkyl hydroperoxides and tertiary alkyl hydroperoxides. Tertiary alkyl hydroperoxides are especially preferred since they are less likely to undergo decompositions involving the cleavage of carbon-carbon bonds under the reaction conditions employed than aralkyl hydroperoxides. Examples of aralkyl hydroperoxides are cumene hydroperoxide, ethylbenzene hydroperoxide, an example of a cycloalkyl hydroperoxide is cyclohexyl hydroperoxide and an example of a tertiary alkyl hydroperoxide is tertiary butyl hydroperoxide, this last compound being the most preferred hydroperoxide.

The hydroperoxide may be used in the stoichiometric amount required for reaction (e.g., 1:1 molar ratio in the case of a monoolefin) or may be used in an excess of stoichiometric, e.g., as much as five or six times the stoichiometrically required amount.

The process of the present invention may be carried out under a wide variety of reaction conditions, for example a temperature of from ambient to 180°C. However, it is preferred not to use a low temperature as the rate of reaction is undesirably low. Conversely, it is preferred that the reaction temperature is not permitted to reach too high a level since this could lead to thermally initiated decomposition of the hydroperoxide, producing undesirable by-products, and in an extreme case might lead to rapid and uncontrollable decomposition of a potentially explosive nature. Accordingly, a preferred reaction temperature is from 80° to 180°C., more preferably 80° to 150°C., and most preferably 120° to 150°C. In some cases the reaction may proceed exothermally to a sufficient extent to render it desirable to control the reaction temperature at the desired level. Conventional techniques can be used for this purpose, such as external cooling and/or regulating the rate at which the reactants are brought into contact with each other.

The pressure at which the reaction is carried out is not narrowly critical. Atmospheric pressure may be convenient. In this case the product ketone may be sufficiently volatile at the reaction temperature to be distilled off and collected in a condenser. Alternatively, a closed reaction vessel may be used and the reaction carried out under the pressure generated during the course of the reaction.

The process of the present invention is preferably carried out in the presence of an organic solvent which is preferably present in an amount such as to provide a solution containing from 5 to 50 percent, more preferably 8 to 30 percent, by weight of the reactants, the solvent being inert to the reactants and products of the reaction.

Preferably, the solvent is an aliphatic or aromatic hydrocarbon, for example, an alkane or a mixture of alkanes which is liquid at room temperature or benzene.

Very small quantities of the catalyst may be successfully employed in the process of the present invention. Larger quantities can also be used. However, this is unnecessary and wasteful and in some cases large quantities of catalyst may be detrimental. Accordingly, in a preferred embodiment of the invention the catalyst is employed in an amount of from 0.00001 to 0.5 mole percent, and most preferably from 0.00001 to 0.0005 mole percent based on the amount of the hydroperoxide.

The process of the present invention proceeds readily and the reaction is normally completed within 10 minutes to 10 hours, although in most cases a time of from 10 minutes to 3 hours is sufficient.

The invention will now be illustrated by the following examples.

EXAMPLE 1

28.2gm of a solution of tertiary butyl hydroperoxide in benzene (containing 28.7% by weight hydroperoxide), 5.04gm of dodec-1-ene and 0.0236gm bis(dithiobenzil) palladium were placed in a glass pressure vessel fitted with a stirrer and the resulting reaction mixture was heated at 130°C. for 3 hours. The conversion of olefin to ketone was 71 percent and selectivity to 2-dodecanone was 73 percent, based on the olefin consumed.

EXAMPLE 2

30gm of a solution of tertiary butyl hydroperoxide in benzene (containing 10 percent by weight hydroperoxide), 5.6gm dodec-1-ene and 0.018gm bis(dithiobenzil) palladium were placed in a glass pressure vessel fitted with a stirrer and the resulting reaction mixture was heated at 130°C. for 3 hours. The conversion of olefin to ketone was 36.3% and selectivity to 2-dodecanone was 91%, based on the olefin consumed.

EXAMPLE 3

1-Dodecene (4,253 parts), tert. butylhydroperoxide (24,060 parts of 9.35 percent solution in benzene) and bisdithiobenzil palladium (5 parts) were charged into a pressure vessel and stirred at 130° for 3 hours during which time the pressure rose to 50 psi.

Analysis of the reaction mixture by GLC using -o-dichlorobenzene as internal standard indicated a 33.0 percent conversion of olefin and a 46.1 percent selectivity to 2-dodecanone.

EXAMPLE 4

The procedure of Example 3 was repeated using the following reactants:

| | |
|---|---|
| 1-Dodecene | 4,054 parts |
| t-Butyl hydroperoxide | 24,130 parts of a 9.3% solution in 60/80 petroleum ether |
| Bis-dithiobenzil palladium | 5 parts |

Analysis of the reaction mixture by GLC indicated a 27.2 percent conversion of olefin and a 50.7 percent selectivity to 2-dodecanone.

EXAMPLE 5

The procedure of Example 3 was repeated using the following reactants:

| | |
|---|---|
| 1-Dodecene | 4,200 parts |
| Ethylbenzene hydroperoxide | 23,220 parts of a 14.8% solution in benzene |
| Bis-dithiobenzil palladium | 5 parts |

Analysis of the reaction mixture by GLC indicated a 21.7% conversion of olefin and a 45.4% selectivity to ketone.

EXAMPLE 6

The procedure of Example 3 was repeated using the following reactants:

| | |
|---|---|
| 1-Dodecene | 42,000 parts |
| t-Butyl hydroperoxide | 208,700 parts of a 10.78% solution in benzene |
| Bis-dithiobenzil platinum | 57 parts |

Analysis of the reaction mixture by GLC indicated a 29.1 percent conversion of olefin and a 17.5 percent selectivity to 2-dodecanone.

EXAMPLE 7

The procedure of Example 3 was repeated using the following reactants:

| | |
|---|---|
| 1-Hexadecene | 5,600 parts |
| 6-Butyl hydroperoxide | 209,300 parts of a 10.78% solution in benzene |
| Bis-dithiobenzil palladium | 5 parts |

Analysis of the reaction mixture by GLC indicated a 14.53 percent conversion of olefin and an 89.2 percent selectivity to 2-hexadecanone.

EXAMPLE 8

The procedure of Example 3 was repeated using the following reactants:

| | |
|---|---|
| 1-Dodecene | 42,000 parts |
| t-Butyl hydroperoxide | 223,400 parts of a 10.07% solution in benzene |
| Bis-dithiobenzil palladium | 5 parts |

Analysis of the reaction mixture by GLC indicated a 33.5 percent conversion of olefin and an 50.5 percent selectivity to 2-dodecanone.

We claim:

1. A process for producing a ketone which comprises oxidizing an olefinically unsaturated hydrocarbon containing from three to 24 carbon atoms with an organic hydroperoxide of the formula R'—OOH, wherein R' is a hydrocarbyl group containing up to 12 carbon atoms and which is unsubstituted or substituted by one or more substituents selected from halogen, alkoxy groups containing up to six carbon atoms, nitro groups and —OOH groups, at a temperature of from ambient temperature to 180°C, in the presence as a catalyst of a metal complex of the formula:

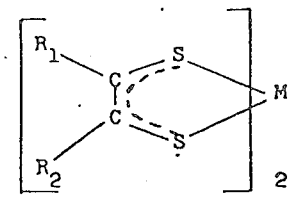

wherein M is an atom of platinum or palladium and $R_1$ and $R_2$, which may be the same or different represent hydrocarbyl groups containing up to 12 carbon atoms which may be unsubstituted or substituted by one or more halogen atoms or alkoxy groups containing up to 6 carbon atoms, or together with the carbon atoms to which they are attached form an alicyclic ring.

2. A process according to claim 1 in which the olefinically unsaturated compound contains from six to 16 carbon atoms.

3. A process according to claim 1 in which the olefinically unsaturated compound contains the grouping —CH=CH$_2$.

4. A process according to claim 3 in which the olefinically unsaturated compound is an alk-1-ene.

5. A process according to claim 1 in which the organic hydroperoxide is a tertiary alkyl hydroperoxide.

6. A process according to claim 1 in which $R^1$ and $R^2$ are each aryl groups.

7. A process according to claim 6 in which $R^1$ and $R^2$ are each phenyl groups.

8. A process according to claim 1 in which the metal complex is bis-dithiobenzil palladium represented by the formula:

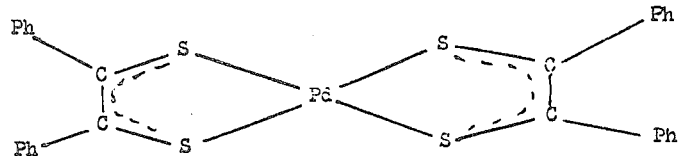

9. A process according to claim 1 in which the metal complex is bis-dithiobenzil platinum represented by the formula:

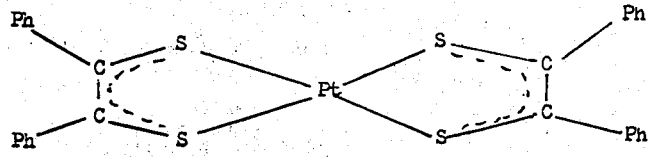

10. A process according to claim 1 in which the oxidation is carried out in the presence as solvent for the reactants of an aliphatic or aromatic hydrocarbon which is inert to the reactants and reaction products.

11. A process according to claim 10 in which the hydrocarbon comprises an alkane or mixture of alkanes which is liquid at room temperature.

12. A process according to claim 10 in which the hydrocarbon is benzene.

13. A process according to claim 1 in which the oxidation is carried out at a temperature of from 80° to 150°C.

14. A process according to claim 13 in which the oxidation is carried out at a temperature of from 120° to 150°C.

15. A process according to claim 1 in which the catalyst is present in an amount of from 0.00001 to 0.5 mole percent based on the amount of the hydroperoxide.

16. A process according to claim 15 in which the catalyst is present in an amount of from 0.00001 to 0.0005 mole percent based on the amount of the hydroperoxide.

* * * * *